United States Patent [19]
Sawada et al.

[11] Patent Number: 5,112,673
[45] Date of Patent: May 12, 1992

[54] LAMINATED MOISTUREPROOF FILM WITH SILICON OXIDE CORE LAYER

[75] Inventors: Tsutomu Sawada; Shinichi Ohhasi; Shigenobu Yoshida, all of Tsuchiura, Japan

[73] Assignee: Mitsubishi Kasei Polytec Company, Tokyo, Japan

[21] Appl. No.: 446,094

[22] Filed: Dec. 5, 1989

[30] Foreign Application Priority Data

Dec. 5, 1988 [JP] Japan .................. 63-307591

[51] Int. Cl.⁵ .................. B32B 13/12; B32B 27/08
[52] U.S. Cl. .................. 428/216; 428/451; 428/516; 428/518; 428/483; 428/425.5; 428/424.4; 428/520
[58] Field of Search .............. 428/216, 451, 516, 518, 428/520

[56] References Cited

U.S. PATENT DOCUMENTS

4,363,840 12/1982 Roullet et al. .................. 428/516 X
4,684,553 8/1987 Sasaki et al. .................. 428/483 X Primary Examiner—P. C. Sluby
Attorney, Agent, or Firm—Wenderoth, Lind & Ponack

[57] ABSTRACT

There are provided two types of moistureproof films of a laminated structure. The first type of moistureproof film comprises a core layer (A) and a protective layer (B) joined to one side of the core layer, wherein: (a) the core layer (A) is composed of a transparent film of a polyvinyl alcohol having a degree of saponification of 99 mol % or higher, the film having a silicon oxide thin film formed on at least one side thereof; and (b) the protective layer (B) is composed of a transparent film including at least one layer of a transparent plastic film having a transparent silicon oxide thin film formed on at least one side thereof. The second type of moistureproof film comprises a moistureproof film of a laminated structure comprising a core layer (A), a protective layer (B) joined to one side of the core layer and a sealant layer (C) joined to the other side of the core layer, wherein: (a) the core layer (A) is composed of a film of a polyvinyl alcohol having a degree of saponification of 99 mol % or higher, the film having a silicon oxide thin film formed on at least one side thereof; (b) the protective layer (B) is composed of a transparent film including at least one layer of a transparent plastic film having a transparent silicon oxide thin film formed on at least one side thereof; and (c) the sealant layer is composed of a sealable resin.

6 Claims, 3 Drawing Sheets

LAMINATED MOISTUREPROOF FILM WITH SILICON OXIDE CORE LAYER

BACKGROUND OF THE INVENTION

This invention relates to a plastic film having high moistureproofness. More specifically, this invention relates to a film of high moistureproofness which is transparent, substantially impermeable to gases such as water vapor, and well-suited for packaging films for EL, elements that are used for back lights in liquid crystal displays.

Liquid crystal displays have been steadily used as display devices for digital watches, electronic desktop calculators and so on, making much use of their low power consumption and in great demand with the advent of liquid crystal games. Ever since, they have found more diverse applications in motor cars, musical instruments, office and factory OA/FA equipment, etc. On the other hand, an organic dispersion type of electroluminescence (EL) elements are being now increasingly used as inexpensive planar-luminous back lights (auxiliary light sources) for liquid crystal displays, taking the advantage of their thinness and lightness. The organic dispersion type of EL elements are packaged with transparent films with excellent moistureproofness, since the luminance of fluorescent substances such as ZnS:Mn and ZnS:Cu considerably decreases by moisture absorption.

Packaging films so far used for the organic dispersion type of EL elements employed for back lights in liquid crystal displays typically include laminated films composed mainly of fluorinated resin films, esp., polychlorotrifluoroethylene (PCTFE) thanks to their high moistureproofness and transparency.

As packaging films for the EL elements, use has been made of PCTFE films generally having a thickness of about 70 to 300 μm and laminated thereon with a heat-sealing polyolefin sealant generally having a thickness of about 20 to 100 μm. Among existing transparent plastic films, such laminated films have been said to possess the highest moistureproofness.

In recent years, on the other hand, transparent plastic films having on their surfaces a transparent thin film, which is formed of an oxide of a metal, inter alia, silicon or aluminium, have been commercially available as packaging materials having gas barrier properties.

However, the conventional laminated films providing packaging films for EL elements and composed primarily of fluorinated resin films, esp., polychlorotrifluoroethylene (PCTFE) are too expensive, thus leading to an increased production cost for back lights. Another problem with the laminated films composed mainly of PCTFE is that their moistureproofness degrades so considerably at an ambient temperature exceeding 50° C. that the service life of EL elements is much reduced at such elevated temperatures.

Accordingly, there has been a strong desire in the art to obtain transparent plastic films which are less expensive and more moisture-resistant than PCTFE films and which are advantageously used as packaging films for the organic dispersion type of EL elements.

Moreover, the conventional transparent plastic films having a transparent thin film of a metal oxide formed on their surfaces are still insufficient in moistureproofness to use as packaging films for the EL elements used for back lights in liquid crystal displays.

This invention has been accomplished in the above background. Accordingly, it is the object of this invention to provide a material which has an improved transparency and moistureproofness, is satisfactory in view of strength and economical considerations, and is particularly well-suited for packaging films for EL elements for back lights in liquid crystal displays, said packaging films being required to possess high moistureproofness.

SUMMARY OF THE INVENTION

As a result of intensive studies made with a view to providing a solution to the above problems, it has now been found that a film comprising a specific polyvinyl alcohol film provided thereon with a silicon oxide thin film has an improved transparency and moistureproofness, and can maintain its moistureproofness in a high temperature and humidity atmosphere over an extended period of time by protecting it with another transparent plastic film provided thereon with a silicon oxide thin film. Such a finding underlies the present invention.

According to the present invention, there are provided two basic types of moistureproof films.

Thus, the first type is a moistureproof film of a laminated structure comprising a core layer (A) and a protective layer (B) joined to one side of the core layer, wherein:

(a) the core layer (A) is composed of a transparent film of a polyvinyl alcohol having a degree of saponification of 99 mol % or higher, the film having a silicon oxide thin film formed on at least one side thereof; and (b) the protective layer (B) is composed of a transparent film including at least one layer of a transparent plastic film having a transparent silicon oxide thin film formed on at least one side thereof.

The second type is a moistureproof film of a laminated structure comprising a core layer (A), a protective layer (B) joined to one side of the core layer and a sealant layer (C) joined to the other side of the core layer, wherein:

(a) the core layer (A) is composed of a transparent film of a polyvinyl alcohol having a degree of saponification of 99 mol % or higher, the film having a silicon oxide thin film formed on at least one side thereof;

(b) the protective layer (B) is composed of a transparent film including at least one layer of a transparent plastic film having a transparent silicon oxide thin film formed on at least one side thereof; and (c) the sealant layer is composed of a sealable resin.

According to the present invention, the aforesaid problems can be solved. Thus, the moistureproof films according to the present invention have excellent transparency, improved moistureproofness and high flexibility, and are very satisfactory in strength and economical considerations. Furthermore, they will not lose their moistureproofness even when used under severe conditions. Therefore, the moistureproof films of the present invention are well-suited for use in fields for which high moistureproofness is required, for instance, in packaging films for EL elements for back lights in liquid crystal displays used under severe conditions over an extended period of time, and so makes a breakthrough in the art.

DETAILED DESCRIPTION OF THE INVENTION

The moistureproof film of the first basic type is of a laminated structure which, as defined above, comprises a core layer (A) and a protective layer (B) joined to one side of the core layer (A).

The moistureproof film of the second basic type is of a laminated structure which, as defined above, a core layer (A), a protective layer (B) joined to one side of the core layer (A) and a sealant layer (C) joined to the other side of the core layer (A).

Core Layer (A)

In the moistureproof films according to the present invention, the core layer is composed of a transparent film in which a transparent silicon oxide thin film (hereinafter simply referred to as an SO thin film) is formed on at least one side of a polyvinyl alcohol film (hereinafter a PVA film for short) made of a polyvinyl alcohol (PVA for short) having a degree of saponification of 99% or higher. It is considered that the bond energy of silicon of the silicon oxide in the SO thin film formed on the PVA film's surface takes different values with respect to the thickness of the SO thin film, and takes a higher value in the vicinity of the surface of the PVA film than those values in the surface and middle portions of the SO thin film. Presumably, this may lead to the achievement of moistureproofness particularly higher than that of an SO thin film formed on the surface of a film other than the PVA film.

The PVA film of the core layer is required to consist of a PVA having a degree of saponification of 99 mol % or more. With a film consisting of a PVA whose degree of saponification is below 99 mol %, any satisfactory moistureproofness cannot be obtained even when the SO thin film is formed on the surface of this film.

The PVA film may or may not be stretched but, in view of its strength and moistureproofness, it should preferably be stretched, particularly, biaxially stretched at a stretch ratio of about 3 × 3.

The SO thin film may be formed on one or both sides of the PVA film. Rather preferably, however, it should be formed on one side of the PVA film, on which the protective layer is to be provided.

The SO thin film may be formed on the surface of the PVA film by depositing silicon monoxide or silicon dioxide or a mixture thereof by any one of the vacuum deposition, sputtering and ion plating techniques. The formation of SO thin film may also be performed by means of the reaction deposition technique using as a deposition material silicon, silicon monoxide or silicon dioxide or a mixture thereof, while supplying an amount of an oxygen gas.

Prior to the formation of the SO thin film on the surface of the PVA film, use may be made of an anchor-coating agent to better the adhesion therebetween. Preferable anchor-coating agents may include adhesion promotors such as those based on isocyanates, polyethyleneimines and organotitanium and adhesives such as those based on polyurethanes/polyesters. As the anchor-coating agents, use may also be made of nonsolvent-type adhesives based on polyethylene, polyesters and polyamides.

The substrate film consisting of PVA, on which the SO thin film is to be formed, may have a thickness ranging from 5 to 400 μm, but particular preference is given to a thickness range of 10 to 200 μm.

It is understood that there is no extreme lowering of the moistureproofness of the end moistureproof film, even when the SO thin film contains as impurities calcium and magnesium or oxides thereof, provided that their amount is less than 10% by weight.

The SO film to be formed on at least one side of the substrate film consisting of PVA may have a thickness ranging from 100 to 5000 Å. A thickness below 100 Å is unpreferred because the resulting moistureproofness becomes insufficient, whereas a thickness exceeding 5000 Å is again unpreferred, partly because a film-curling problem arises and partly because the transparent thin film per se is likely to crack or exfoliate.

It is noted that the core layer (A) may be comprised of either a single layer of the transparent PVA film having the transparent SO thin film formed on the PVA film, or two or more layers of transparent PVA films each having the transparent SO thin film where the PVA films are bonded using an adhesive. Adhesives usable to this end may include those based on urethanes, acrylics, polyesters and so on.

Protective Layer (B)

In the present invention, the core layer (A) is laminated on at least one side, preferably its side provided with an SO thin film, with a protective layer (B) consisting of a transparent film including at least one layer of a transparent plastic film having an SO thin film formed on at least one side thereof. It is desired that the SO thin film formed on the above plastic film not located at a position where it is exposed on the outer surface side of the laminate of the present invention, because of the fear that it may suffer scratching or indentation, resulting in degradation of moistureproofness.

Although the transparent plastic film is not critical, it may preferably be a biaxially stretched film made of little moisture-absorptive plastics such as polypropylene, propylene copolymers, polyethylene terephthalate, polyvinyl chloride and polyethylene.

The SO thin film may be formed on at least one side of the substrate film by the same techniques as mentioned above for the formation of SO thin film on the surface of the PVA film.

The protective layer (B) may be comprised of a single layer of the transparent plastic film having the SO thin film or a laminate of two or more such films. Furthermore, such single layer or laminate may be coated on its SO thin film side with a transparent film having no SO thin film.

When the protective layer (B) is comprised of such a coated or uncoated laminate as mentioned above, adhesives based on urethanes, acrylics, polyesters and so on may be used as laminating adhesives.

Sealant Layer (C)

In the moistureproof film of the second basic type according to the present invention, a sealant layer which is sealable by any known sealing technique such as heat, ultrasonic or high-frequency sealing is laminated on the other side of the core layer (A), preferably on the PVA film side thereof. Such a sealant layer is formed of a sealable resin and may be in the form of a bonded and laminated film or an extrusion-laminated coating layer. In particular, heat sealing is easily carried out with relatively inexpensive equipment and is thus preferably used. Generally usable for the heat-sealable sealant layers are low-density polyethylene, ethylene/vinyl acetate copolymers, polypropylene, ethylene/a- crylate copolymers (ionomers) and so on. It is appreciated, however, that copolymers of ethylene/acrylic acid (EAA) and ethylene/ethyl acrylate (EEA) are preferable for highly moistureproof purposes such as packaging films for EL elements in view of the prevention of permeation of moisture from the sealed interface.

Formation of Laminated Structure

The protective layer (B), or the protective (B) and the sealant layer (C) may be joined to the surface of the core layer (A) by any one of known techniques such as a dry- or extrusion-laminating technique using adhesives based on urethanes, acrylics, polyesters and so on. When the sealant layer (C) is joined in the form of a film, such film may be unstretched or uniaxially or biaxially stretched. The lamination of the sealant layer (C) may be carried out either before or after the formation of the SO thin film on the core layer (A).

Depending upon the content to be wrapped, a moistureproof film is required to possess ultraviolet screenability in addition to moistureproofness. If desired, such ultraviolet screenability may be imparted to the moistureproof films according to the present invention by, for example, previously adding a ultraviolet absorbing agent to the above adhesives before the lamination of the core layer (A) with the protective layer (B) (and) the sealant layer (C). Commercially available ultraviolet absorbers such as those based on benzophenone, benzotriazole and so on may be used alone or in combination and in quantities determined depending upon the ultraviolet absorptivity required. It is to be understood that ultraviolet screenability may also be obtained by using the layers (A)-(C) forming films containing an ultraviolet-absorbing substance.

In view of strength, flexibility, economical considerations and other factors, the thickness of the moistureproof films according to the present invention is preferably in a range of 50 to 500 μm, more preferably 100 to 300 μm. Preferably, the ratio of thickness between the respective layers (A), (B) and (C), except adhesive layers, is 1:1-10:1-10.

It is noted that between the core and protective layers (A) and (B) or the core and sealant layers (A) and (C), there may be interposed another transparent plastic film to regulate the overall thickness of the moistureproof film. Although the plastic film to be interposed is not critical if it is transparent, use may preferably be made of the same plastic film as forming the protective layer (B). The thickness of the plastic film to be interposed may then be selected with the overall thickness of the moistureproof film in mind.

SPECIFIC EMBODIMENTS OF THE MOISTUREPROOF FILMS ACCORDING TO THE PRESENT INVENTION

FIGS. 1 to 4 illustrate the laminated structures of the moistureproof film of the first type according to the present invention.

Figure 1:
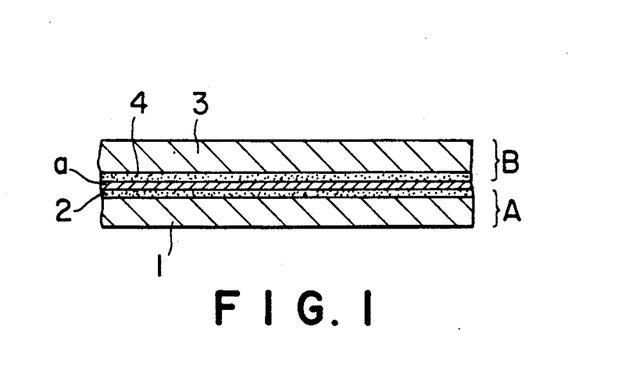
FIGS. 1 through 9 are schematic sectional views illustrating the structures of the films according to the present invention.

Referring to FIG. 1, there is shown a basic structure of the moistureproof film of the first type. A core layer (A) comprises a single layer of a transparent PVA film 1 having a transparent SO thin film 2 formed on one side of the film 1. A protective layer (B) comprising a single layer of a transparent plastic film 3 having a transparent SO thin film 4 formed on one side of the film 3 is laminated on the side of the SO thin film 2 of the core layer (A) with the SO thin film 4 inside and through an adhesive layer a.

Figure 2:
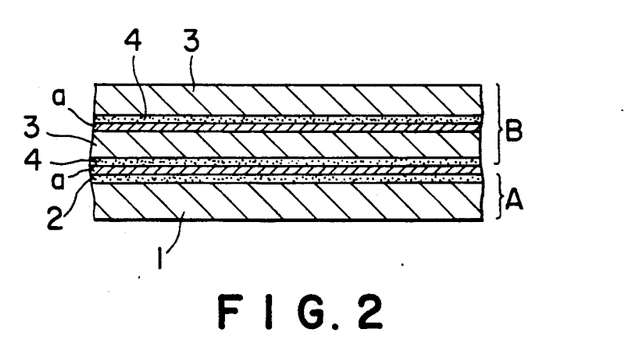

Referring to FIG. 2, there is shown another structure of the moistureproof film of the first type according to the present invention. A protective layer (B) consisting of a laminate obtained by bonding and laminating two transparent plastic films 3, each having a transparent SO thin film 4 formed on one side thereof, is laminated on the side of an SO thin film 2 of a core layer (A) with the SO thin film 4 inside and through an adhesive layer a.

Figure 3:
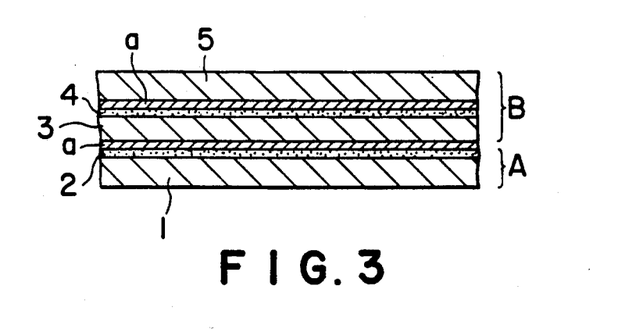

Referring to FIG. 3, there is shown a further structure of the moistureproof film of the first type. A core layer (A) comprises a transparent PVA film 1 and a transparent SO thin film 2 formed on one side of the PVA film 1, while a protective layer (B) is comprised of a laminate obtained by bonding and laminating a transparent film 5 having no transparent SO thin film onto a transparent SO thin film 4 formed on a transparent plastic film 3. With the plastic film 3 inside, the protective layer (B) is laminated on the SO thin film 2 side of the core layer (A) through an adhesive layer a.

Figure 4:
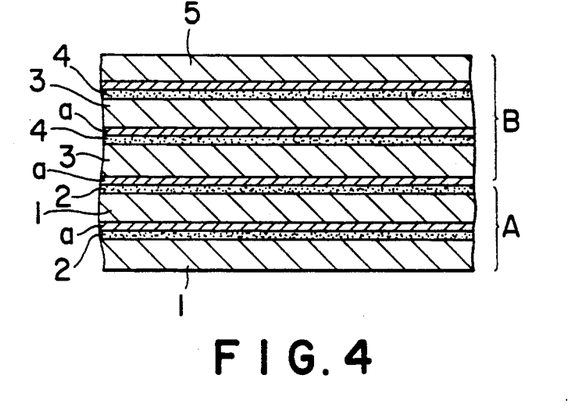

Referring to FIG. 4., there is shown a still further structure of the moistureproof film of the first type. A core layer (A) is comprised of a laminate obtained by the lamination of two PVA films 1, each having a transparent SO thin film 2 formed one side thereof, while a protective layer (B) is comprised of a laminate obtained by the lamination of two transparent plastic films 3, each having a transparent SO thin film 4 formed on one side thereof, with a transparent film 5 having no SO thin film. With the plastic film 3 inside, the protective layer (B) is laminated on the SO thin film of the core layer (A) through an adhesive layer a.

FIGS. 5 to 9 illustrate the laminated structures of the moistureproof of the second type according to the present invention.

Figure 5:
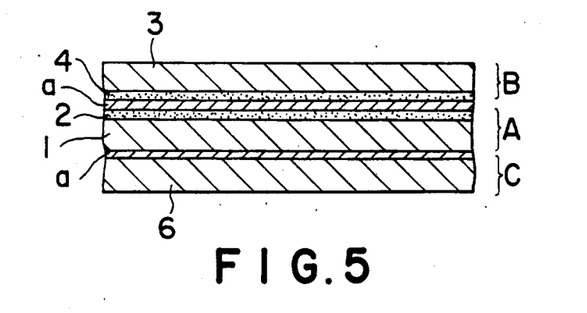

Referring to FIG. 5, there is shown a basic structure of the moistureproof film of the second type. A sealant layer 6 formed of a sealable resin is laminated on the side of the PVA film 1 forming the core layer of the moistureproof film shown in FIG. 1 through an adhesive layer a.

Figure 6:
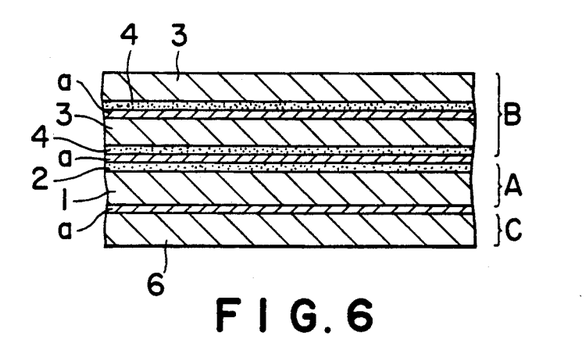

Referring to FIG. 6, there is shown another structure of the moistureproof film of the second type. A sealant layer 6 formed of a sealable resin is laminated on the side of the PVA film 1 forming the core layer of the moistureproof film shown in FIG. 2 through an adhesive layer a.

Figure 7:
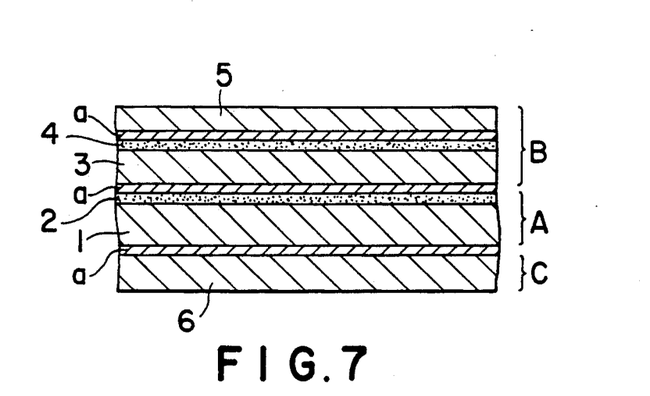

Referring to FIG. 7, there is shown a further structure of the moistureproof film of the second type. A sealant layer 6 formed of a sealable resin is laminated on the side of the PVA film 1 forming the core layer of the moistureproof film shown in FIG. 3 through an adhesive layer a.

Figure 8:
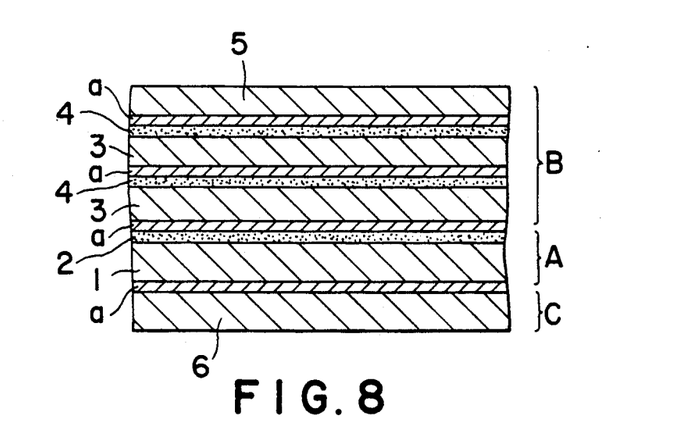

Referring to FIG. 8, there is shown a still further structure of the moistureproof film of the second type. A core layer (A) is composed of a transparent PVA film 1 having a transparent SO thin film 2 formed on one side thereof, while a protective layer (B) is comprised of a laminate obtained by the lamination of two transparent plastic films 3, each having a transparent SO thin film 4 formed on one side thereof, with a transparent film 5 having no SO thin film. With the plastic film 3 inside, the protective layer (B) is laminated on the SO thin film side of the core layer (A) through an adhesive layer a, and a sealant layer 6 formed of a sealable resin is laminated on the side of the PVA film 1 of the core layer (A) through an adhesive layer a.

Figure 9:
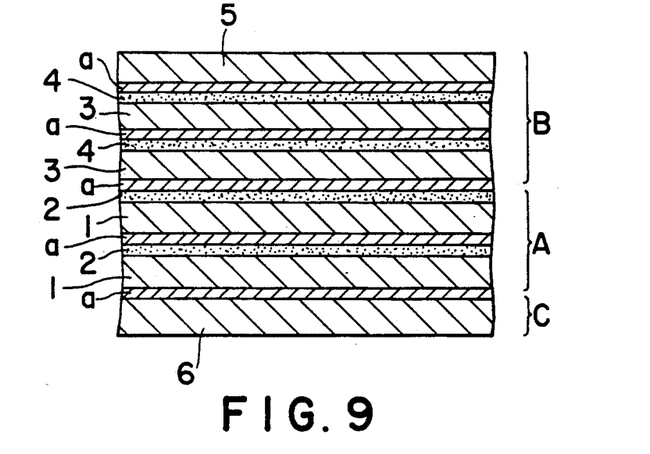

Referring to FIG. 9, there is shown a still further structure of the moistureproof film of the second type. A sealant layer 6 formed of a sealable resin is laminated on the side of the PVA film 1 forming the core layer of the moistureproof film shown in FIG. 4 through an adhesive layer a.

Function Analysis of the Moistureproof Films According to the Present Invention

Reference will now be made to the function of the moistureproof films of the above structures according to the present invention. The explanation to follow is made for a better understanding of the invention, rather than to limit the scope of the invention.

The moistureproof films of the present invention achieve much more improved moistureproofness even in a high-temperature region by protecting the core layer (A), specifically the SO thin film formed on the surface of the PVA film forming the core layer (A), with the protective layer (B), viz., a laminate including a plastic film which is different from the PVA film and has an SO thin film formed on the surface thereof.

More specifically, the bond energy of silicon of the SO thin film formed on the surface of the PVA film is generally higher in the vicinity of the surface of the PVA film than those in the surface and middle-layer portions of the SO thin film. Thus, the film having such an SO thin film exhibits excellent moistureproofness at normal temperatures. In a high-temperature and— humidity atmosphere, however, the PVA film absorbs moisture and undergoes a dimensional change so large that the surface SO thin film can break and lose its own moistureproofness. This problem will be solved by protecting the PVA film with a protective film. When using as a protective film an ordinary film, a PVDC film, a film coated with PVDC, etc., however, the PVA film is hardly expected to prevent moisture absorption at 50° C. or higher, since the above films will undergo a considerable deterioration of moistureproofness at high humidity. To the contrary, the transparent film used as the protective layer (B) in the present invention and including a plastic film having the SO thin film serves to effectively protect the transparent film of the core layer even in a high-temperature region, since its deteriorations of moistureproofness are much more reduced in a high-temperature region. It is thus believed that the PVA film having the SO thin film can maintain excellent moistureproofness even at high temperatures.

The present invention will now be further explained by referring to the following examples that are given to illustrate some embodiments of the invention without implying any limitation.

In the examples, the moisture permeability and transparency of the obtained films were determined by the following methods. The thickness of the transparent thin films of a silicon oxide was measured with a crystal type film thickness meter.

(i) Moisture Permeability of Film (g/m²·24h)

A bag of 100 × 100 mm sealed at its three edges was prepared from a given moistureproof film. After 30 g of granular anhydrous calcium chloride was packed in the bag as a moisture absorbent, it was sealed at its remaining one edge to prepare a sample. Each ten such samples were placed for about 500 hours in the respective atmospheres of 40° C. × 90% RH; 50° C. × 90% RH; and 60° C. × 90% RH to determine the moisture permeability of the moistureproof films from the overall weight changes.

(ii) Transparency of Film (%)

The visible light transmittance of a film was measured with a spectrophotometer made by Hitachi Co., Ltd. The films' transparency was then determined in terms of light transmittance at 500 nm.

A transparent silicon oxide thin film having a thickness of 1000 Å was formed on one side of a film (biaxially stretched at a stretch ratio of 3 × 3 to a thickness of 12 μm) of PVA having a degree of saponification of 99.9 mol % by heating and evaporating silicon monoxide (SiO) with a purity of 99.9% under a vacuum of 5 × 10⁻⁵ Torr in an electron beam heating manner, thereby obtaining a transparent film (A).

On the other hand, a silicon oxide thin film having a thickness of 1000 Å was formed on one side of a polyethylene terephthalate film (biaxially stretched at a stretch ratio of 3 × 3 to a thickness of 12 μm and hereinafter simply referred to as a PET film) in the same manner as mentioned above, thereby preparing a transparent plastic film (B).

The SO films of the films (A) and (B) were laminated together with a urethane base adhesive to obtain a laminated plastic film of such a two-layered structure as shown in FIG. 1.

The moisture permeability and transparency of the obtained film were measured by the above described methods. The results are shown in Table 1.

EXAMPLE 2

In Example 1, a film of PVA having a degree of saponification of 99.0 mol % was used in place of the film of PVA having a degree of saponification of 99.9 mol In an otherwise similar manner, a transparent plastic film of a two-layered structure was obtained.

The obtained film was estimated in the same manner as explained in Ex. 1. The results are shown in Table 1.

EXAMPLE 3

In Example 1, the thickness of the SO thin film on the surface of the PVA film was changed to 200 Å. In an otherwise similar manner, a transparent plastic film of a double-layered structure was obtained.

The obtained film was estimated in the same manner as in Ex. 1. The results are shown in Table 1.

EXAMPLE 4

In Example 1, a laminate obtained by the lamination of two transparent plastic films (B) with a urethane base adhesive was used instead of a single transparent plastic film (B). In an otherwise similar manner, a transparent laminated film of such a three-layered structure as shown in FIG. 2 was obtained.

The obtained film was estimated in the same manner as in Ex. 1. The results are shown in Table 1.

EXAMPLE 5

With the use of a urethane base adhesive, a film of an ethylene/vinyl acetate copolymer (an unstretched film having a thickness of 60 μm and hereinafter simply called an EVA film) was laminated on the PVA film side of the laminated plastic film of a two-layered structure, obtained in Example 1, thereby obtaining a transparent laminated film of such a three-layered structure as shown in FIG. 5, having a sealant layer joined thereto.

The obtained film was estimated in the same manner as in Ex. 1. The results are shown in Table 1.

EXAMPLE 6

With the use of a urethane base adhesive, an EVA film (unstretched and having a thickness of 60 μm) was laminated on the PVA film side of the laminated plastic film of a two-layered structure, obtained in Example 2, thereby obtaining a transparent laminated film of such a three-layered structure as shown in FIG. 5, having a sealant layer joined thereto.

The obtained film was estimated in the same manner as in Ex. 1. The results are shown in Table 1.

EXAMPLE 7

With the use of a urethane base adhesive, an EVA film (unstretched and having a thickness of 60 μm) was laminated on the PVA film side of the laminated plastic film of a two-layered structure, obtained in Example 3, thereby obtaining a transparent laminated film of such a three-layered structure as shown in FIG. 5, having a sealant layer joined thereto.

The obtained film was estimated in the same manner 30 as in Ex. 1. The results are shown in Table 1.

EXAMPLE 8

With the use of a urethane base adhesive, an EVA film (unstretched and having a thickness of 60 μm) was laminated on the PVA film side of the laminated plastic film of a three-layered structure, obtained in Example 4, thereby obtaining a transparent laminated film of such a four-layered structure as shown in FIG. 6, having a sealant layer joined thereto.

The obtained film was estimated in the same manner as in Ex. 1. The results are shown in Table 1.

COMPARATIVE EXAMPLE 1

In Example 1, a PET film having no SO thin film was used as a protective film instead of the SO thin film-containing containing PET film [film (B)]. In an otherwise similar manner, a transparent film of a two-layered structure was obtained.

The obtained film was estimated in the same manner as in Ex. 1. The results are shown in Table 1.

COMPARATIVE EXAMPLE 2

In Example 1, a PVA film having no SO thin film was used instead of the SO thin film-containing PVA film. In an otherwise similar manner, a transparent film of a two-layered structure was obtained.

The obtained film was estimated in the same manner as in Ex. 1. The results are shown in Table 1.

COMPARATIVE EXAMPLE 3

In Example 1, a film of PVA having a degree of saponification of 94.0 mol % was used instead of the film of PVA having a degree of saponification of 99.9 mol %. In an otherwise similar manner, a transparent film of a two-layered structure was obtained.

The obtained film was estimated in the same manner as in Ex. 1. The results are shown in Table 1.

COMPARATIVE EXAMPLE 4

In Example 1, a PET film was used instead of the PVA film of the core layer. In an otherwise similar manner, a transparent film of a two-layered structure was obtained.

The obtained film was estimated in the same manner as in Ex. 1. The results are shown in Table 1.

COMPARATIVE EXAMPLE 5

In Example 5, a PET film having no SO thin film was used as a protective film instead of the SO thin film-thereby containing PET film [film (B)]. In an otherwise similar manner, a transparent film of a three-layered structure was obtained.

The obtained film was estimated in the same manner as in Ex. 1. The results are shown in Table 1.

COMPARATIVE EXAMPLE 6

In Example 5, a PVA film having no SO thin film was used instead of the SO thin film-containing PVA film. In an otherwise similar manner, a transparent film of a three-layered structure was obtained.

The obtained film was estimated in the same manner as in Ex. 1. The results are shown in Table 1.

COMPARATIVE EXAMPLE 7

In Example 5, a film of PVA having a degree of saponification of 94.0 mol % was used instead of the film of PVA having a degree of saponification of 99.9 mol %. In an otherwise similar manner, a transparent film of a three-layered structure was obtained.

The obtained film was estimated in the same manner as in Ex. 1. The results are shown in Table 1.

COMPARATIVE EXAMPLE 8

In Example 5, a PET film was used instead of the PVA film of the core layer. In an otherwise similar manner, a transparent film of a three-layered structure was obtained.

The obtained film was estimated in the same manner as in Ex. 1. The results are shown in Table 1.

COMPARATIVE EXAMPLE 9

A film of polychlorotrifluoroethylene ("Nitflon" made by Nitto Denko Co., Ltd., provided with a sealant and having a total thickness of 250 μm) was estimated in the same manner as in Example 1. The results are shown in Table 1.

EXAMPLES 9 & 10

A (single) film (A) of the same type as used in Example 1, viz., a transparent PVA film having an SO thin film on its one side, was used as a core layer. Used as protective layers were laminates obtained by the successive lamination with a urethane base adhesive of two (Ex. 9) or three (Ex. 10) transparent PET films (B) of the same type as used in Ex. 1, each having an SO thin film, and one PET film (biaxially stretched to a thickness of 100 μm) having no SO thin film. Each protective layer was joined to the SO thin film side of the core layer, while a film of an ethylene/ethyl acrylate copolymer (unstretched and having a thickness of 40 μm and hereinafter simply called an EEA film) was laminated on the PVA film side of the core layer with the use of a urethane base adhesive. Thus, two transparent films of such a structure as shown in FIG. 8, each having a sealant layer joined thereto, were obtained.

The obtained films were each estimated in the same manner as mentioned in Example 1. The results are shown in Table 2.

EXAMPLE 11

A film (A) of the same type as used in Example 1 was used as a core layer, while a transparent PET film (biaxially stretched to a thickness of 100 μm) having an SO thin film formed on one side thereof was used as a protective layer. With a urethane base adhesive, the core and protective layers were joined together with their SO thin film sides brought in contact with each other. In the same manner as in Example 9, a sealant layer consisting of an EEA film was then joined to the PVA film side of the core layer to obtain a transparent laminated film of such a structure as shown in FIG. 5.

The obtained film was estimated in the same manner as in Example 1. The results are shown in Table 2.

EXAMPLES 12-14

In Example 9, the thickness of the SO thin film of the core layer was changed to 200 μm (Ex. 12); the thickness of the SO thin film of the protective layer to 200 μm (Ex. 13); or the thickness of the sealant layer to 80 μm (Ex. 14). In an otherwise similar manner, three transparent laminated films of such a structure as shown in FIG. 8, each having a sealant layer joined thereto, were obtained.

The obtained films were each estimated in the same manner as mentioned in Example 1. The results are shown in Table 2.

EXAMPLES 15 & 16

In Example 9, two (Ex. 15) or three (Ex. 16) transparent PVA films, each having an SO thin film formed on one side thereof, were laminated with the use of a urethane base adhesive to prepare a core layer. In an otherwise similar manner, two transparent laminated films of such a structure as shown in FIG. 9, each having a sealant layer joined thereto, were obtained.

The obtained films were each estimated in the same manner as mentioned in Example 1. The results are shown in Table 2.

EXAMPLES 17 & 18

In Example 9, a polypropylene film (biaxially stretched to a thickness of 20 μm and hereinafter simply referred to as an OPP film) having an SO thin film formed on one side was used in place of the PET film having an SO thin film on its one side (Ex. 19), or an OPP film (biaxially stretched to a thickness of 40 μm) having no SO thin film was used in place of the PET film having no SO thin film (Ex. 18). In an otherwise similar manner, two transparent laminated films of such a structure as shown in FIG. 8, each having a sealant layer joined thereto, were obtained.

The obtained films were each estimated in the same manner as in Example 1. The results are shown in Table 2.

EXAMPLES 19 & 20

In Example 9, the thickness of the SO thin film of the core layer was changed to 50 μm (Ex. 19), or the thickness of the SO thin film of the protective layer to 50 μm (Ex. 20). In an otherwise similar manner, two transparent laminated films of such a structure as shown in FIG. 8, each having a sealant layer joined thereto, were obtained.

The obtained films were each estimated in the same manner as in Example 1. The results are shown in Table 2.

COMPARATIVE EXAMPLES 10 & 11

In Example 9, a transparent PET film (biaxially o stretched to a thickness of 12 μm) having an SO thin film formed on one side thereof (Comp. Ex. 10) or a transparent OPP film (biaxially stretched to a thickness of 20 μm) having an SO thin film formed on one side thereof (Comp. Ex. 11) was used as a core layer in place of the transparent PVA film having an SO thin film formed on one side thereof. In an otherwise similar manner, two transparent laminated films of such a structure as shown in FIG. 8, each having a sealant layer joined thereto, were obtained.

The obtained films were each estimated in the same manner as in Example 1. The results are shown in Table 2.

COMPARATIVE EXAMPLE 12 & 13

In Example 9, a PVA film having no SO thin film was used as a core layer (Comp. Ex. 12), or a transparent PET film having no SO thin film was used as a protective layer (Comp. Ex. 13). In an otherwise similar manner, two transparent laminated films of such a structure as shown in FIG. 8, each having a sealant layer joined thereto, were obtained.

The obtained films were each estimated in the same manner as in Example 1. The results are shown in Table 2.

TABLE 1

| No. | Core layer (A) | | | Protective layer (B) | | | Total thickness* (inclusive of sealant) (μm) | Moisture permeability (gr/m$^2$ · 24 H) | | | Transparency (%) |
|---|---|---|---|---|---|---|---|---|---|---|---|
| | Type of film | Degree of saponification (%) | Thickness of SO thin film (Å) | Type of film | Thickness of SO thin film (Å) | Number of films | | 40° C. × 90% RH | 50° C. × 90% RH | 60° C. × 90% RH | |
| Ex. 1 | PVA | 99.9 | 1000 | PET | 1000 | 1 | 24 no sealant | 0.03 | 0.07 | 0.14 | 80 |
| Ex. 2 | PVA | 99.0 | 1000 | PET | 1000 | 1 | 24 no sealant | 0.03 | 0.09 | 0.19 | 80 |
| Ex. 3 | PVA | 99.9 | 200 | PET | 1000 | 1 | 24 no sealant | 0.03 | 0.08 | 0.18 | 81 |
| Ex. 4 | PVA | 99.9 | 1000 | PET | 1000 | 2 | 26 no sealant | 0.03 | 0.06 | 0.12 | 78 |
| Ex. 5 | PVA | 99.9 | 1000 | PET | 1000 | 1 | 84 | 0.04 | 0.09 | 0.18 | 78 |
| Ex. 6 | PVA | 99.0 | 1000 | PET | 1000 | 1 | 84 | 0.04 | 0.10 | 0.21 | 78 |
| Ex. 7 | PVA | 99.9 | 200 | PET | 1000 | 1 | 84 | 0.04 | 0.09 | 0.19 | 79 |
| Ex. 8 | PVA | 99.9 | 1000 | PET | 1000 | 2 | 96 | 0.04 | 0.07 | 0.14 | 76 |
| Comp. Ex. 1 | PVA | 99.9 | 1000 | PET | — | 1 | 24 no sealant | 1.03 | 3.00 | 9.85 | 82 |
| Comp. Ex. 2 | PVA | 99.9 | — | PET | 1000 | 1 | 24 no sealant | 1.10 | 3.35 | 4.65 | 82 |

TABLE 1-continued

| No. | Core layer (A) | | | Protective layer (B) | | | Total thickness* (inclusive of sealant) (μm) | Moisture permeability (gr/m² · 24 H) | | | Trans- parency (%) |
|---|---|---|---|---|---|---|---|---|---|---|---|
| | Type of film | Degree of saponifi- cation (%) | Thickness of SO thin film (Å) | Type of film | Thickness of SO thin film (Å) | Number of films | | 40° C. × 90% RH | 50° C. × 90% RH | 60° C. × 90% RH | |
| Comp. Ex. 3 | PVA | 94.0 | 1000 | PET | 1000 | 1 | 24 no sealant | 0.70 | 2.10 | 4.80 | 80 |
| Comp. Ex. 4 | PET | — | 1000 | PET | 1000 | 1 | 24 no sealant | 0.27 | 0.75 | 1.40 | 80 |
| Comp. Ex. 5 | PVA | 99.9 | 1000 | PET | — | 1 | 84 | 1.05 | 3.10 | 10.10 | 80 |
| Comp. Ex. 6 | PVA | 99.9 | — | PET | 1000 | 1 | 84 | 1.20 | 2.50 | 5.05 | 80 |
| Comp. Ex. 7 | PVA | 94.0 | 1000 | PET | 1000 | 1 | 84 | 0.80 | 2.40 | 5.10 | 78 |
| Comp. Ex. 8 | PET | — | 1000 | PET | 1000 | 1 | 84 | 0.25 | 0.60 | 1.15 | 78 |
| Comp. Ex. 9 | PCTFE | — | — | — | 1000 | — | 250 | 0.04 | 0.15 | 0.24 | 69 |

*except the thickness of adhesive layers

TABLE 2

| No. | Core layer (A) | | | | Protective layer (B) | | | | | |
|---|---|---|---|---|---|---|---|---|---|---|
| | | | | | with SO thin film | | | | no SO thin film | |
| | Type of film | Thickness of SO thin film (Å) | Number of films | Thick- ness (μm) | Type of film | Thickness of SO thin film (Å) | Number of films | Thick- ness (μm) | Type of film | Thick- ness (μm) |
| Ex. 9 | PVA | 1000 | 1 | 12 | PET | 1000 | 2 | 24 | PET | 100 |
| Ex. 10 | PVA | 1000 | 1 | 12 | PET | 1000 | 3 | 36 | PET | 100 |
| Ex. 11 | PVA | 1000 | 1 | 12 | PET | 1000 | 1 | 100 | — | — |
| Ex. 12 | PVA | 200 | 1 | 12 | PET | 1000 | 2 | 24 | PET | 100 |
| Ex. 13 | PVA | 1000 | 1 | 12 | PET | 200 | 2 | 24 | PET | 100 |
| Ex. 14 | PVA | 200 | 1 | 12 | PET | 1000 | 2 | 24 | PET | 100 |
| Ex. 15 | PVA | 200 | 2 | 24 | PET | 1000 | 2 | 24 | PET | 100 |
| Ex. 16 | PVA | 200 | 3 | 36 | PET | 1000 | 2 | 24 | PET | 100 |
| Ex. 17 | PVA | 200 | 1 | 12 | OPP | 1000 | 2 | 40 | PET | 100 |
| Ex. 18 | PVA | 200 | 1 | 12 | PET | 1000 | 2 | 24 | OPP | 40 |
| Ex. 19 | PVA | 50 | 1 | 12 | PET | 1000 | 2 | 24 | PET | 100 |
| Ex. 20 | PVA | 200 | 1 | 12 | PET | 50 | 2 | 24 | PET | 100 |
| Comp. Ex. 10 | PET | 1000 | 1 | 12 | PET | 1000 | 2 | 24 | PET | 100 |
| Comp. Ex. 11 | OPP | 1000 | 1 | 20 | PET | 1000 | 2 | 24 | PET | 100 |
| Comp. Ex. 12 | PVA | — | 1 | 12 | PET | 1000 | 2 | 24 | PET | 100 |
| Comp. Ex. 13 | PVA | 200 | 1 | 12 | PET | — | 2 | 24 | PET | 100 |

| No. | Sealant layer (c) | | Total thickness* (μm) | Moisture permeability (gr/m² · 24 H) | | | Trans- parency (%) |
|---|---|---|---|---|---|---|---|
| | Type of film | Thick- ness (μm) | | 40° C. × 90% RH | 50° C. × 90% RH | 60° C. × 90% RH | |
| Ex. 9 | EEA | 40 | 176 | 0.04 | 0.07 | 0.14 | 76 |
| Ex. 10 | EEA | 40 | 188 | 0.02 | 0.04 | 0.10 | 75 |
| Ex. 11 | EEA | 40 | 152 | 0.03 | 0.06 | 0.12 | 77 |
| Ex. 12 | EEA | 40 | 176 | 0.06 | 0.11 | 0.22 | 78 |
| Ex. 13 | EEA | 40 | 176 | 0.06 | 0.10 | 0.20 | 79 |
| Ex. 14 | EEA | 80 | 216 | 0.04 | 0.07 | 0.14 | 76 |
| Ex. 15 | EEA | 40 | 188 | 0.02 | 0.04 | 0.10 | 75 |
| Ex. 16 | EEA | 40 | 200 | 0.01 | 0.03 | 0.08 | 74 |
| Ex. 17 | EEA | 40 | 192 | 0.04 | 0.07 | 0.14 | 76 |
| Ex. 18 | EEA | 40 | 116 | 0.04 | 0.07 | 0.14 | 76 |
| Ex. 19 | EEA | 40 | 176 | 0.21 | 0.45 | 0.80 | 79 |
| Ex. 20 | EEA | 40 | 176 | 0.28 | 0.60 | 0.91 | 79 |
| Comp. Ex. 10 | EEA | 40 | 176 | 0.25 | 0.60 | 0.15 | 76 |
| Comp. Ex. 11 | EEA | 40 | 184 | 0.23 | 0.55 | 0.05 | 76 |
| Comp. Ex. 12 | EEA | 40 | 176 | 0.45 | 0.95 | 2.10 | 80 |
| Comp. Ex. 13 | EEA | 40 | 176 | 0.35 | 0.80 | 1.70 | 80 |

*except the thickness of adhesive layers.

From Tables 1 and 2 it is apparent that the moisture-proof films according to the present invention exhibit more improved moistureproofness under high-temperature and -humidity conditions over the comparative films.

What is claimed is:

1. A moistureproof film of a laminated structure comprising a core layer (A) and a protective layer (B) joined to one side of said core layer, wherein:
   (a) said core layer (A) is composed of a transparent film of a polyvinyl alcohol having a degree of saponification of 99 mol % or higher, said film having a silicon oxide thin film formed on at least one side thereof; and
   (b) said protective layer (B) is composed of a transparent film including at least one layer of a transparent plastic film having a transparent silicon oxide thin film formed on at least one side thereof.

2. The moistureproof film according to claim 1, wherein said silicon oxide thin film is formed by any one of the vacuum deposition method, sputtering method and ion plating method.

3. The moistureproof film according to claim 1, wherein the thickness of the polyvinyl alcohol film of said core layer is selected from a range of 5 to 400 μm, the thickness of the silicon oxide thin film formed on the polyvinyl alcohol film is selected from a range of 100 to 5000 Å, and the total thickness of the moistureproof film is selected from a range of 10 to 500 μm.

4. A moistureproof film of a laminated structure comprising a core layer (A), a protective layer (B) joined to one side of said core layer and a sealant layer (C) joined to the other side of said core layer, wherein:

(a) said core layer (A) is composed of a film of a polyvinyl alcohol having a degree of saponification of 99 mol % or higher, said film having a silicon oxide thin film formed on at least one side thereof;

(b) said protective layer (B) is composed of a transparent film including at least one layer of a transparent plastic film having a transparent silicon oxide thin film formed on at least one side thereof; and (c) said sealant layer is composed of a sealable resin.

5. The moistureproof film according to claim 4, wherein said silicon oxide thin film is formed by any one of the vacuum deposition method, sputtering method and ion plating method.

6. The moistureproof film according to claim 4, wherein the thickness of the polyvinyl alcohol film of said core layer is selected from a range of 5 to 400 μm, the thickness of the silicon oxide thin film formed on the polyvinyl alcohol film is selected from a range of 100 to 5000 Å, the total thickness of said protective and sealant layers is selected from a range of 5 to 400 μm, and the total thickness of the moistureproof film is selected from a range of 10 to 500 μm.

* * * * *